United States Patent [19]
Kiuchi

[11] Patent Number: 5,029,492
[45] Date of Patent: Jul. 9, 1991

[54] SPEED SHIFTING TIME CONTROL DEVICE OF AUTOMATIC TRANSMISSION

[75] Inventor: Morio Kiuchi, Hiroshima, Japan

[73] Assignee: Mazda Motor Corporation, Hiroshima, Japan

[21] Appl. No.: 567,714

[22] Filed: Aug. 15, 1990

[30] Foreign Application Priority Data

Aug. 23, 1989 [JP] Japan .................. 1-217012

[51] Int. Cl.$^5$ ........................... B60K 41/18
[52] U.S. Cl. ........................... 74/844; 74/851
[58] Field of Search .................. 74/844, 851

[56] References Cited

U.S. PATENT DOCUMENTS 4,283,970 8/1981 Vukovich ................. 74/866

FOREIGN PATENT DOCUMENTS 0109767 6/1983 Japan ..................... 74/844

Primary Examiner—Dirk Wright
Attorney, Agent, or Firm—Sixbey, Friedman, Leedom & Ferguson

[57] ABSTRACT

The device of the present invention changes the target value of speed shifting time in an automatic transmission according to the oil temperature of line pressure. According to this device, in the case where the oil temperature of line pressure is high, the quantity of heat generation due to sliding of friction elements can be reduced by shortening the speed shifting time, with the result of improvement of friction elements in durability to heat and reliability.

12 Claims, 13 Drawing Sheets

| THROTTLE OPENING / GEAR POSITION | 0/8 | 1/8 | | 7/8 | 8/8 |
|---|---|---|---|---|---|
| 1→2 | (P1) | ---- | | ---- | ---- |
| 1→3 | ---- | ---- | | ---- | ---- |
| 1→4 | ---- | ---- | | ---- | ---- |
| 2→3 | ---- | ---- | | ---- | ---- |
| 2→4 | ---- | ---- | | ---- | ---- |
| 3→4 | ---- | ---- | | ---- | ---- |

OIL TEMPERATURE
OF LINE PRESSURE TF

TARGET VALUE OF
SPEED SHIFTING TIME

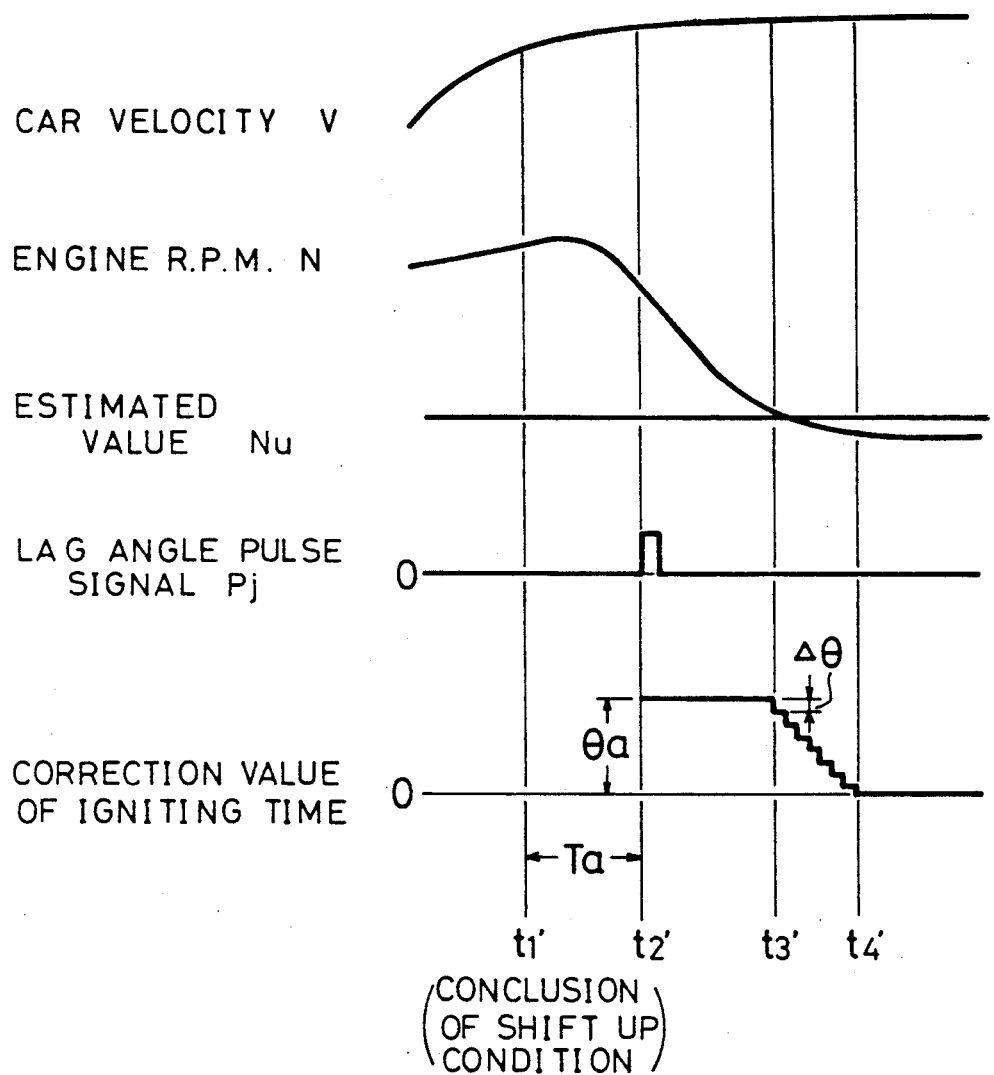

SPEED SHIFTING TIME CONTROL DEVICE OF AUTOMATIC TRANSMISSION

BACKGROUND OF THE INVENTION

1. Field of the Invention

This invention relates to an improvement of a speed shifting time control device of an automatic transmission.

2. Description of the Prior Art

As a speed shifting time control device of an automatic transmission, such devices as disclosed by U.S. Pat. No. 4,283,970 and Japanese Patent Application Publication Gazette No. 63-3183, for example, have been known. According to these devices, time required for speed shifting (hereinafter referred to as "speed shifting time") which is done by operation of friction elements is measured and line pressure to be supplied to the friction elements is learningcontrolled so that the above speed shifting time becomes a target value at the succeeding speed shifting.

The target value of speed shifting time mentioned above is so set beforehand that speed shifting shock can be restricted effectively and durability of friction elements to sliding can be ensured.

However, it has been found that in the case where the target value of speed shifting time is set at the specified value, the following defects are experienced, namely, if the oil temperature of line pressure is high, the temperature of friction elements is easy to rise due to heat generated by sliding of friction elements (as compared with the case of low oil temperature in the same speed shifting time) and therefore, under the condition of high oil temperature durability of friction elements is easy to deteriorate and their reliability is reduced.

SUMMARY OF THE INVENTION

The present invention has for its object to ensure good durability of friction elements to heat, irrespective of oil temperature line pressure.

In order to attain the above object, in the present invention the amount of heat generated by sliding of friction elements is diminished under high oil temperature by varying the target value of speed shifting time according to the oil temperature of line pressure. More particularly, the device according to the present invention is composed of a line pressure regulating means to regulate line pressure optionally, a speed shifting time detecting means to detect time required for speed shifting which is done by operation of friction elements worked by line pressure, a line pressure correcting means to correct line pressure by controlling the line pressure regulating means so as to make the speed shifting time detected by the speed shifting time detecting means a target value, an oil temperature detecting means to detect oil temperature of line pressure and a target value changing means to change the target value of speed shifting time according to oil temperature detected by the oil temperature detecting means.

Under the above composition of the present invention, the target value of speed shifting time is changed according to the oil temperature of line pressure and under the high oil temperature, the target value of speed shifting time can be changed to short time. Accordingly, sliding time of friction elements at speed shifting is lessened due to shorter speed shifting time and as a result, the amount of heat generated by sliding is reduced and durability of friction elements to heat is improved.

The above object and novel features of the present invention will be made more apparent by reading the following detailed description, with reference to the accompanying drawings.

BRIEF DESCRIPTION OF THE DRAWINGS

The attached drawings show preferred embodiments of the present invention, in which:

FIG. 15 is an explanatory drawing of how shift up is done.

DETAILED DESCRIPTION OF THE INVENTION

A description is made below of each embodiment of the present invention, with reference to the drawings.

Figure 1:
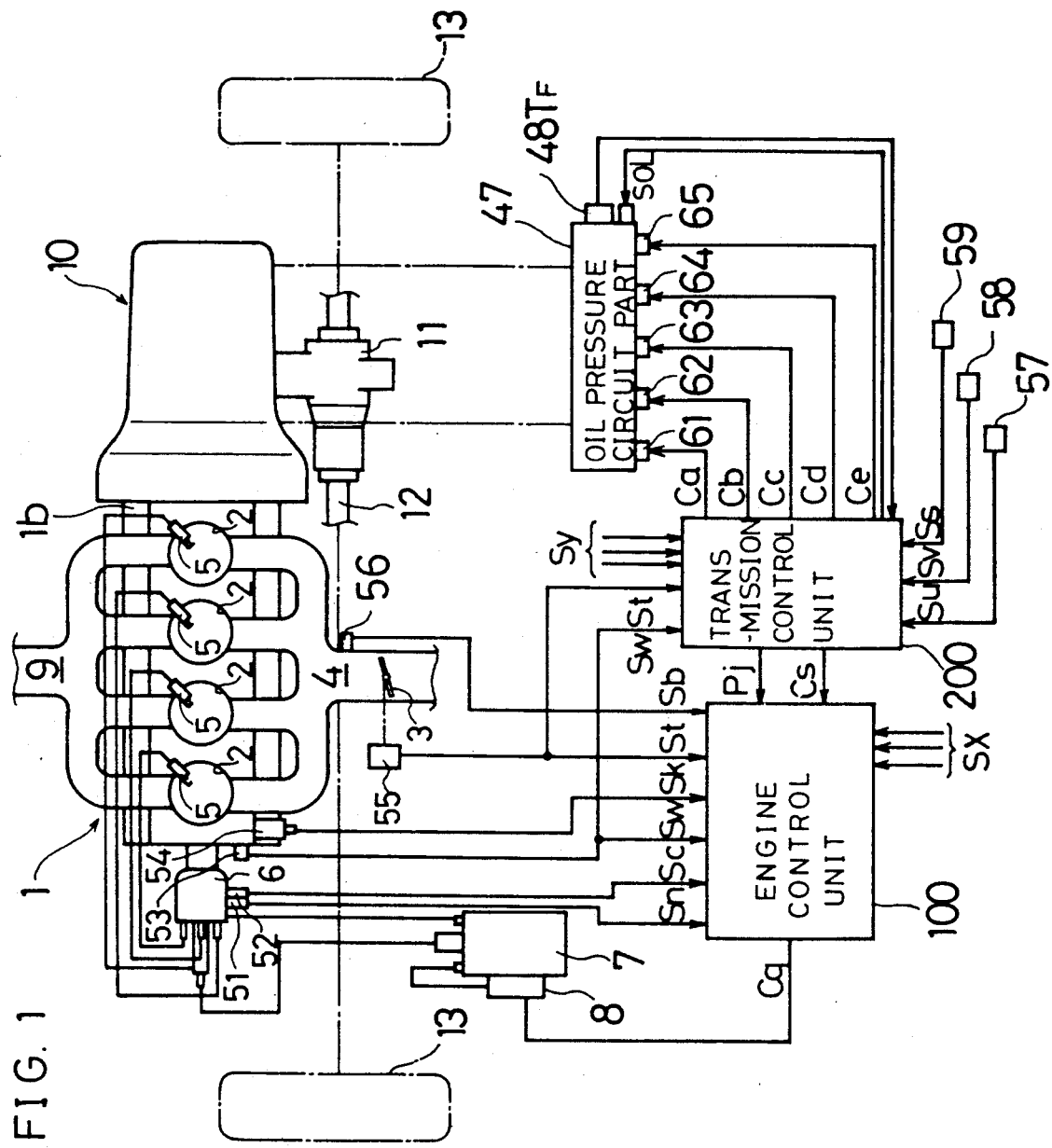
FIG. 1 shows a whole composition.

In FIG. 1, an engine 1 has four cylinders 2. Mixture is supplied to each cylinder 2 via an intake passage 4 having a throttle valve 3. Mixture supplied in the cylinder 2 is ignited in the specified order in the cylinder 2 by operation of an igniting system composed by an ignition plug 5, a distributer 6, an ignition coil part 7, an ignition control part 8, etc. and exhaust gas generated is discharged to an exhaust passage 9. By such ignition of mixture, an engine output shaft of the engine rotates and engine torque obtained from the engine output shaft is transmitted to front wheels 13 via a power transmitting channel formed by an automatic transmission 10, a differential gear unit 11, and axle 12, etc.

Figure 2:
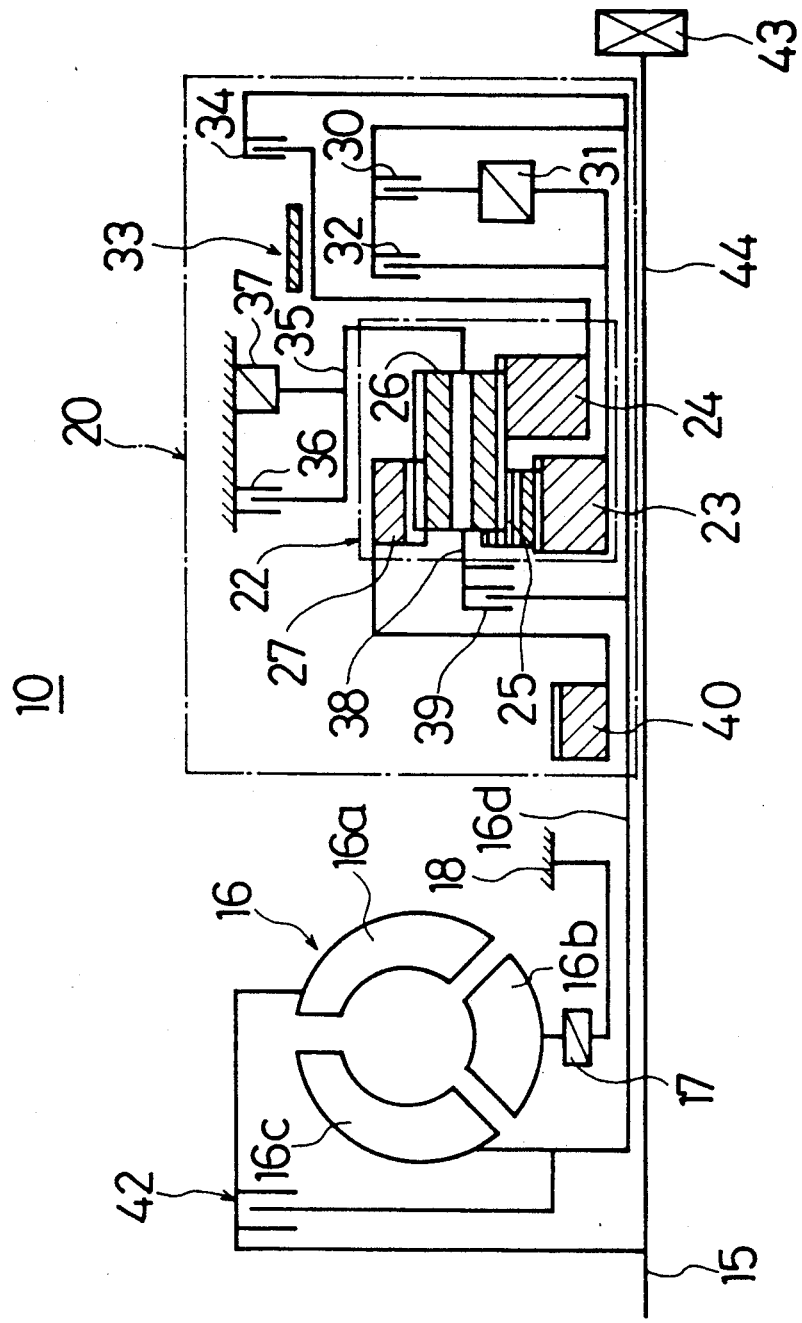
FIG. 2 is a skeleton drawing of an automatic transmission.

Before the remainder of FIG. 1 is explained, an explanation is made about the composition of the automatic transmission 10 on the basis of FIG. 2.

The automatic transmission 10 in FIG. 2 is of forward 4-stage and reverse 1-stage type. Reference numeral 15 designates an engine output shaft 15. Reference numeral 16 designates a torque converter provided with a pump 16a connected to the engine output shaft 15, a stator 16b and a turbine 16c. The stator 16b is provided fixably at a case 18 through the medium of a one-way clutch 17 which prevents the stator 16b from rotating in the direction opposite to the turbine 16c. Reference numeral 20 designates a speed change gear connected to a converter output shaft 16d which is connected to the turbine 16c of the torque converter 16.

The speed change gear 20 has within a Lavinyo type planetary gearing 22. This planetary gearing 22 comprises a sun gear 23 of small diameter, a sun gear 24 of large diameter, a short pinion gear 25 which meshes with the sun gear 23 of small diameter, a long pinion gear 26 which meshes with the sun gear 24 of large diameter and the short pinion gear 25 and a ring gear 27 which meshes with the long pinion gear 26. The sun gear 23 of small diameter is connected to the output shaft 16d of the torque converter 16 through the medium of a forward clutch 30 provided rearwardly of the sun gear 23 and a first one-way clutch 31 which is connected vertically to the clutch 30 and which checks the reverse drive of the converter output shaft 16d. A coast clutch 32 is connected in a row to the channel connecting vertically the forward clutch 30 and the one-way clutch 31. The sun gear 24 of large diameter is connected to the output shaft 16d of the torque converter 16 through the medium of a 2-4 brake 33 provided rearwardly of the sun gear 24 and a reverse clutch 34 arranged rearwardly of the 2-4 brake 33. Connected to the long pinion gear 26 in a row through the medium of its rear side carrier 35 are a low & reverse brake 36 which fixes the long pinion gear 26 and a second one-way clutch 37 which allows the long pinion gear 26 to rotate in the same direction as the engine output shaft 15. A front side carrier 38 of the long pinion gear 26 is connected to the output shaft 16d of the torque converter 16 through the medium of a 3-4 clutch 39. The ring gear 27 is connected to an output gear 40 arranged in front of the ring gear 27. In FIG. 2, reference numeral 42 designates a lock up clutch which connects the engine output shaft 15 directly with the converter output shaft 16d. Reference numeral 43 designates an oil pump which is driven by the engine output shaft 15 through the medium of an intermediate shaft 44.

Operation of each clutch and each brake at each gear position under the above composition is shown in the following table.

In order to carry out action control of the engine 1 (in FIG. 1) and the automatic transmission 10 (in FIG. 2), in FIG. 1 an engine control unit 100 and a transmission control unit 200 are provided.

Supplied to this engine control unit 100 are detection signals Sn and Sc indicating the engine r.p.m. and the crank angle obtained from a r.p.m. sensor 51 provided at the distributer 6 and from a crank angle sensor 52 respectively, detection signals Sw and Sk indicating the cooling water temperature Tw of the engine and the knocking strength obtained from a water temperature sensor 53 and from a knocking sensor 54 respectively, a detection signal St obtained from a throttle opening sensor 55 provided in relation to the throttle valve 3 and a detection signal Sb obtained from an intake negative pressure sensor 56 arranged at the downstream side from the throttle valve 3 in the intake passage 4. Also, a detection signal $T_F$ of an oil temperature sensor 48 (as a oil temperature detecting means to detect the oil temperature of line pressure in an oil pressure circuit part 47 for action-controlling of the automatic transmission is inputted and the other detection signal Sx necessary for controlling of the engine 1 is supplied, to the engine control unit 100.

Supplied to the transmission control unit 200 in FIG. 1 are detection signals Sw and St obtained form the water temperature sensor 53 and from the throttle opening sensor 55 respectively, detection signal Su obtained from a turbine r.p.m. sensor 57, a detection signal Sv obtained from a vehicle velocity sensor 58, a detection signal Ss according to the range position of a shift lever obtained from a shift position sensor 59 and a detection signal Sy necessary for controlling the automatic transmission 10. On the basis of these various detection signals, the transmission control unit 200 froms driving pulse signals Ca, Cb, Cc and Cd and transmits them selectively to solenoid valves 61, 62, 63 and 64 which control supply and discharge of working oil pressure (line pressure) in relation to various friction elements incorporated in the speed change gear 20 for carrying out speed shift control in the automatic transmission 10.

|  | REVERSE CLUTCH | COAST CLUTCH | FORWARD CLUTCH | 3-4 CLUTCH | LOW & REVERSE BRAKE | 2-4 BRAKE | No. 1 ONE-WAY CLUTCH | No. 2 ONE-WAY CLUTCH |
|---|---|---|---|---|---|---|---|---|
| P |  |  |  |  |  |  |  |  |
| R | 0 |  |  |  | 0 |  |  |  |
| N |  |  |  |  |  |  |  |  |
| (D) RANGE |  |  |  |  |  |  |  |  |
| 1 SPEED SHIFT STAGE |  |  | 0 |  |  |  | (0) | (0) |
| 2 SPEED SHIFT STAGE |  |  | 0 |  |  | 0 | (0) |  |
| 3 SPEED SHIFT STAGE |  | 0 | 0 | 0 |  |  | (0) |  |
| 0 D |  |  | 0 | 0 |  | 0 |  |  |
| (2) RANGE |  |  |  |  |  |  |  |  |
| 1 SPEED SHIFT STAGE |  |  | 0 |  |  |  | (0) |  |
| 2 SPEED SHIFT STAGE |  | 0 | 0 |  |  | 0 | (0) |  |
| 3 SPEED SHIFT STAGE |  | 0 | 0 | 0 |  |  | (0) |  |
| (1) RANGE |  |  |  |  |  |  |  |  |
| 1 SPEED SHIFT STAGE |  | 0 | 0 |  | 0 |  | (0) |  |
| 2 SPEED SHIFT STAGE |  | 0 | 0 |  |  | 0 | (0) |  |

Remark:
(0) Shows that a clutch is working but is not contributing to power transmission.

Also, the transmission control unit 200 forms a driving pulse signal Ce and transmits it selectively to a solenoid valve 65 which carries out supply and discharge of working oil pressure in relation to the lock up clutch 42 for carrying out lock up-control in the automatic transmission 10.

Figure 3:
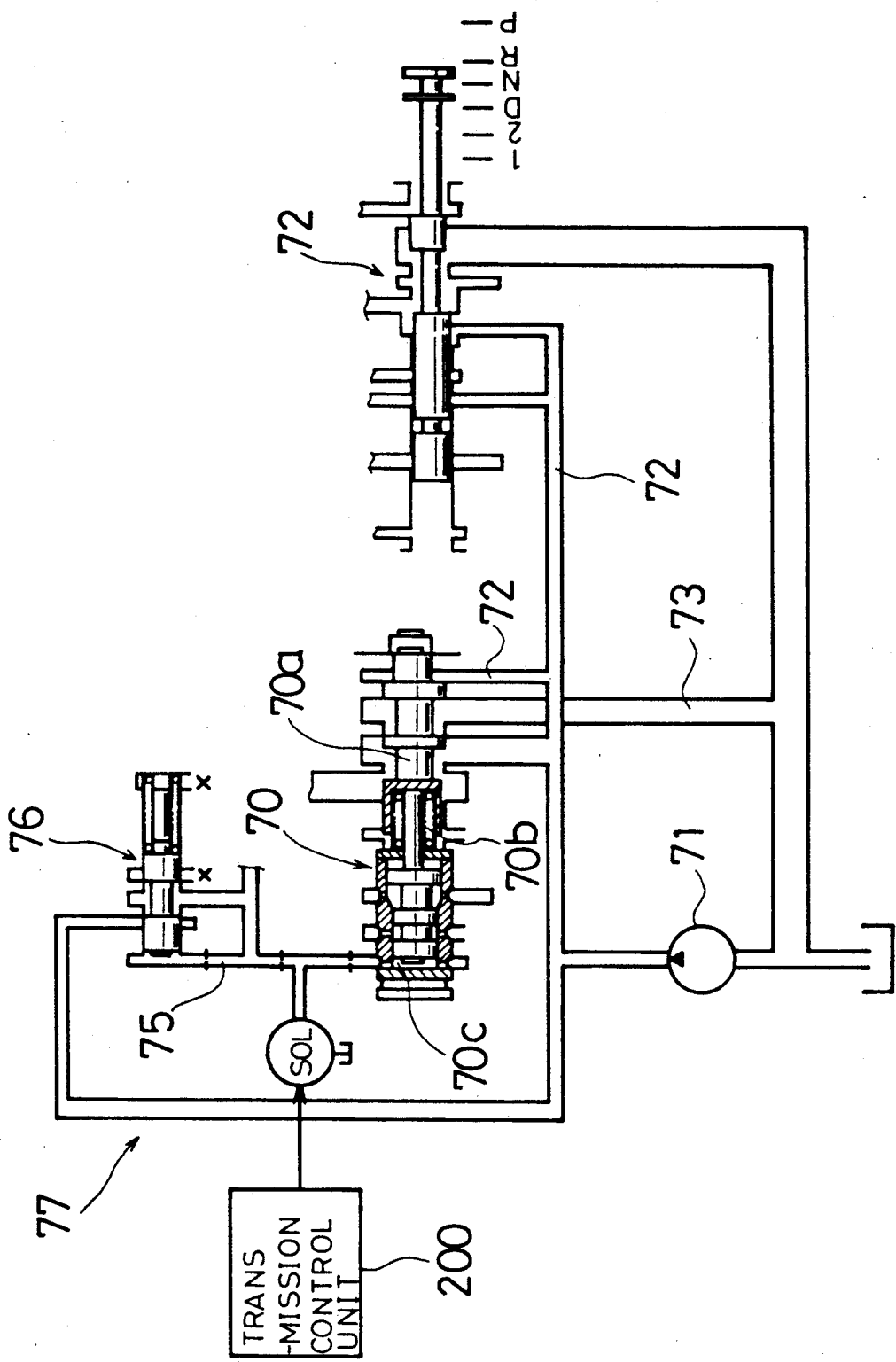
FIG. 3 is an oil pressure circuit diagram for regulating line pressure.

A concrete composition of the oil pressure circuit part 47 which works each friction element of the automatic transmission 10 is shown in FIG. 3. In FIG. 3, reference numeral 70 designates a pressure regulating valve which regulates oil pressure from an oil pump 71 driven by the engine 1 and generates line pressure. Reference numeral 72 designates a manual valve which works in linkage with a select lever manipulated by a driver. Friction elements of the automatic transmission 10 are connected (oil suppliably and dischargeably) to the manual valve 71 via a plurality of shift valves (not shown in the drawing).

The pressure regulating valve 70 has a spool 70a and a spring 70b which biases the spool 70a in the left direction in the figure by a biasing force Sp. Oil pressure P from the oil pump 71 acts on the right side end (in the figure) of the spool 70a and control pressure for line pressure regulating acts on an oil room 70c on the left side. By moving the spool 70a right and left minutely by the relative magnitude between the total pressure T (target line pressure) of this control pressure and the biasing force Sp, communication/outting off regulation between a line pressure passage 72 and a drain passage 73 is carried out to adjust the oil pressure P to the total pressure T (target line pressure).

As the composition of generating control pressure, an oil passage 75 is connected to the oil room 70c, oil pressure (discharge pressure of the oil pump 71 decompressed by a decompression valve 76) acts on the oil passage 75 and a duty electromagnetic valve SOL is connected to the intermediate part of the oil passage 75. Thus, a line pressure regulating means 77 is composed, whereby line pressure is regulated in magnitude by regulating the magnitude of control pressure through regulation of the opening rate of the oil passage 75 to the oil tank by ON-OFF operation of the duty electromagnetic valve SOL.

Figure 4:
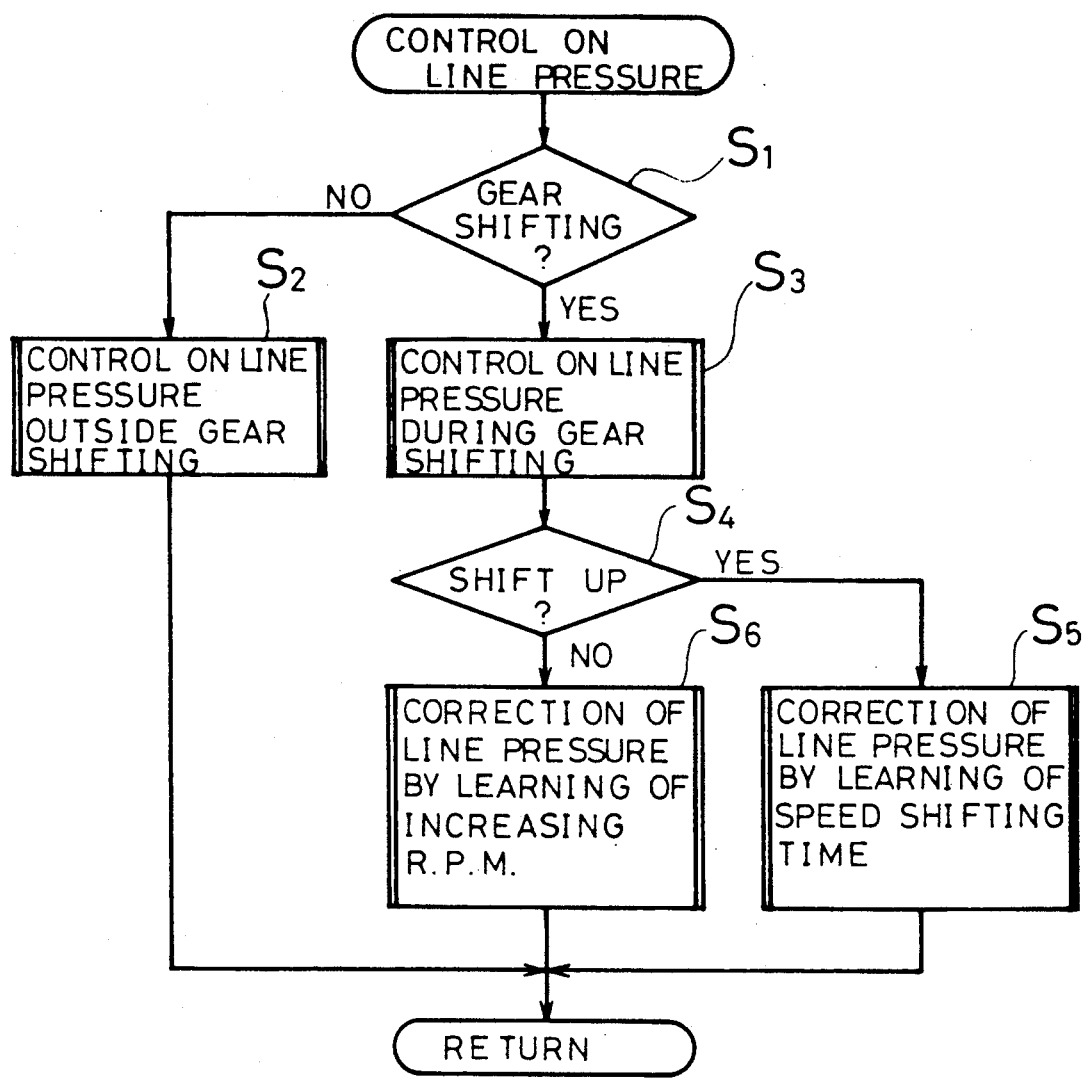
FIG. 4 and FIG. 5 are flow charts shOwing the contrOl of line pressure.

An explanation is made below about the line pressure control shown in FIG. 4.

Figure 5:
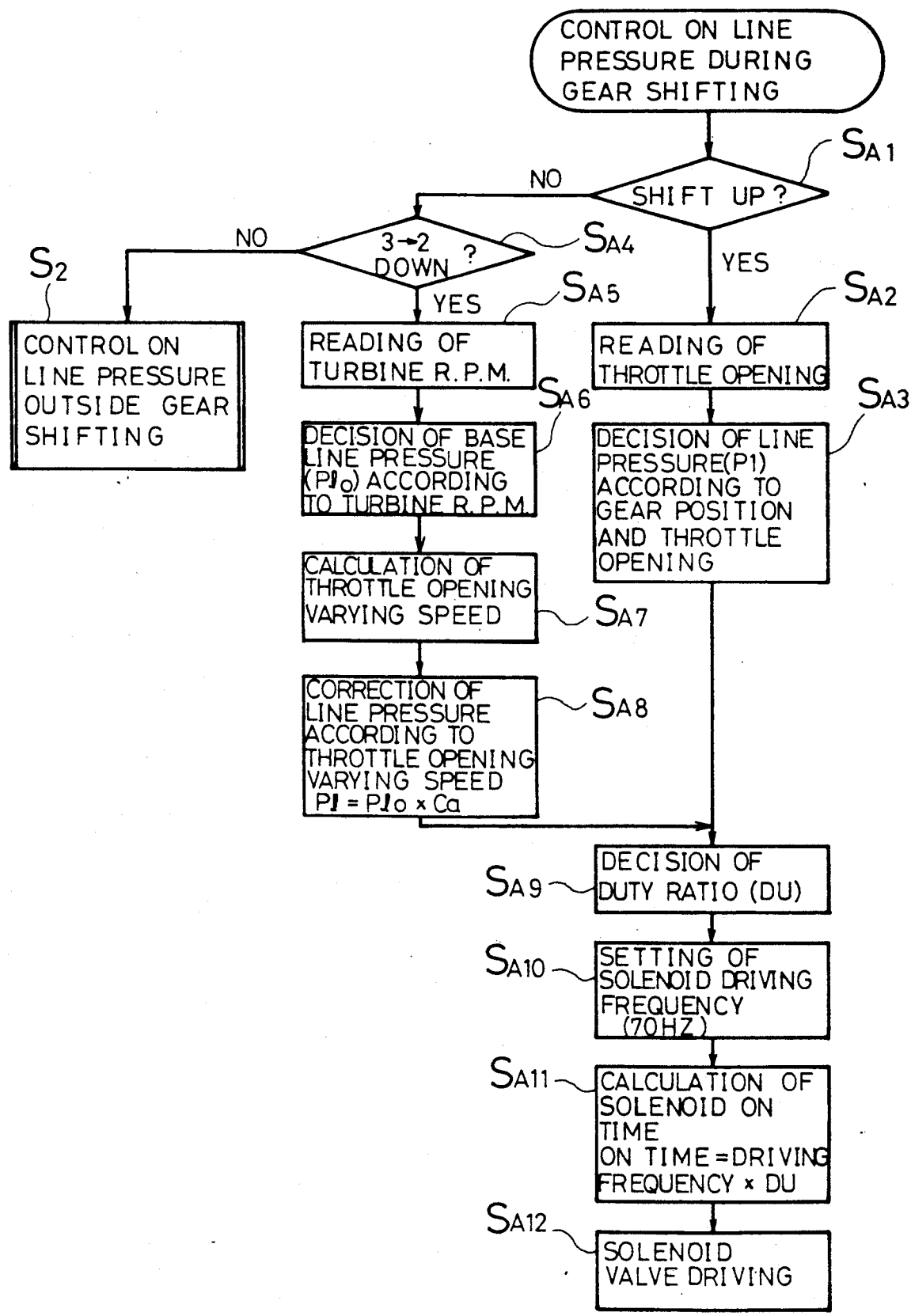
Figure 7:
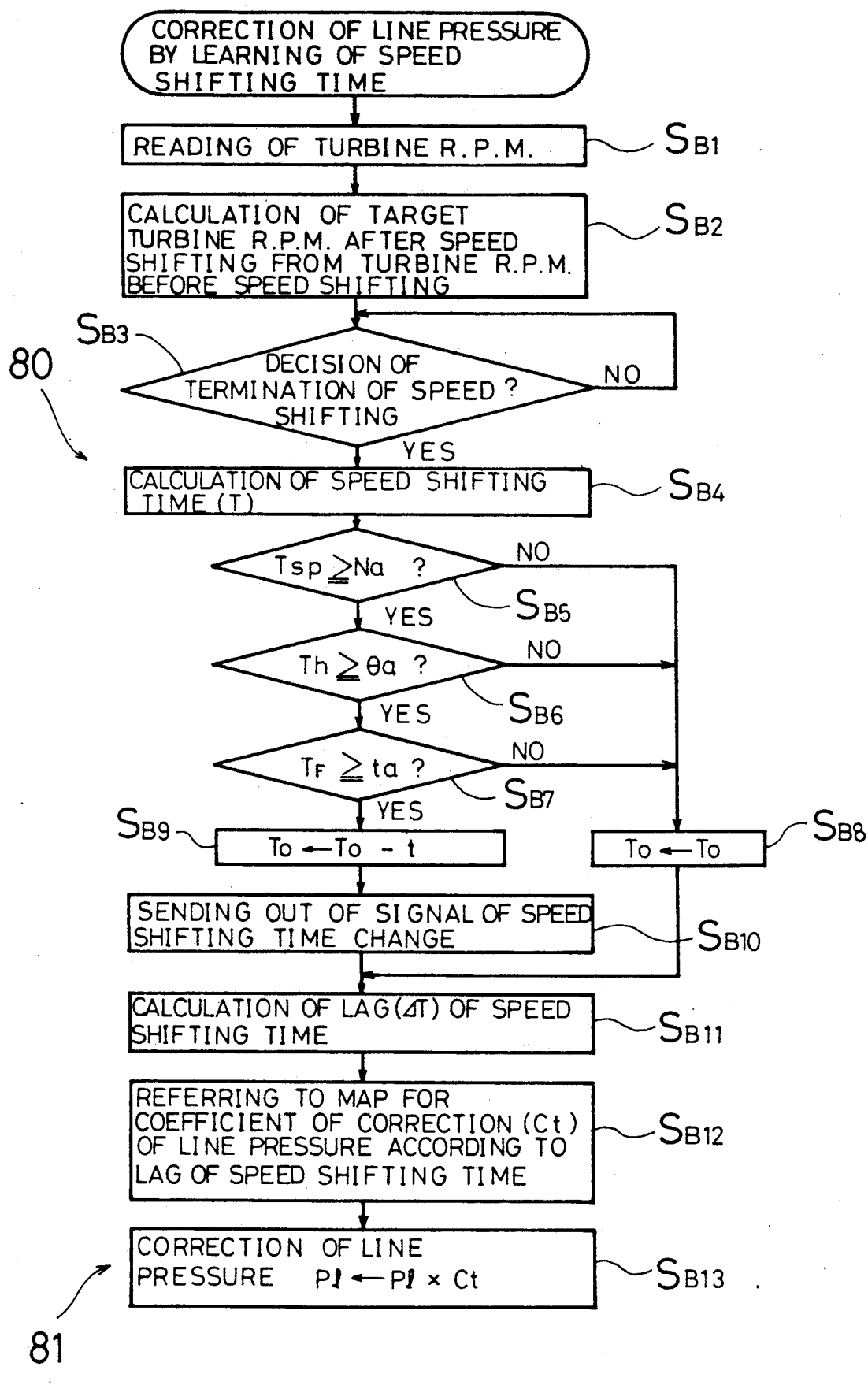
FIG. 7 is a flow chart showing the line pressure control for making the speed shifting time a target value.

At step $S_1$, whether or not it is the speed shifting time is judged and if judgment is NO, it is put to the LINE pressure control outside the speed shifting, namely, line pressure is controlled to a pressure value corresponding to the throttle opening and the turbine r.p.m. On the other hand, if judgment at step $S_1$ is YES, at step $S_3$ the routine FIG. 5 is carried out and at step $S_4$ whether or not it is shift up is examined. If judgment at step $S_4$ is YES, at step $S_5$ the routine of line pressure control by learning of speed shifting time shown in FIG. 7 is carried out, but if judgment at step $S_4$ is NO (shift down), correction of line pressure by learning of rising r.p.m. (namely, correction of line pressure according to the difference between the target turbine r.p.m. after speed shifting and the turbine rotation at the point of time when speed shifting almost terminates) is carried out.

An explanation is made below about the line pressure control during speed shifting in FIG. 5.

In this routine, at step $S_1$ whether or not it is shift up is examined. If it is shift up, at step $S_2$ the throttle opening is read and at step $S_3$ line pressure $P_l$ is decided according to the gear position and the thrOttle opening before and after speed shifting. Thus line pressure at the time of shift up can be regulated properly. More particularly, since shock at the time of shift up relates to the engine output and the gear position according to the throttle opening and the partial torque and capacity of friction elements which are shifted at speed shifting time are different according to the gear position, if line pressure is set irrespective of the gear position as usual, it is impossible to regulate all gear positions to the optimum connecting speed only by setting characteristic of the accumulator in the oil pressure control circuit 47. In this embodiment, therefore, it is so designed that a value corresponding to line pressure at each combination of gear positions before and after speed shifting is stored as map in a memory of the control unit, as shown in FIG. 6(a), and line pressure is obtained from the map.

Figures 6A, 6B:
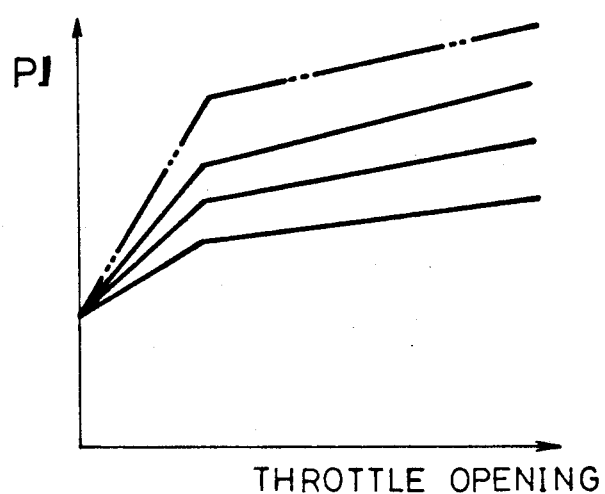
FIGS. 6A and 6B show a line pressure characteristic according to gear position and throttle opening.

Conventionally, as shown by the two-dot chain line in FIG. 6(b) line pressure is set at a comparatively high of such extent that sliding of all friction elements can be prevented but in this embodiment, as shown by solid lines in FIG. 6(b) line pressure is set at a value lower than the conventional value and according to gear positions, line pressure is set at a different value.

If judgment at step $S_{A1}$ is NO, namely, at the time of shift down, at step $S_{A4}$ whether or not it is shift down from the third gear to the second gear is examined. If the judgement is YES, calculation of line pressure by steps $S_{A5}$ –$S_{A8}$ is carried out, but if the judgment is NO, it is passed to the line pressure control outside the speed shifting (step $S_2$ in FIG. 4). The reason why this process is taken is that at the time of shift down from the third gear to the second gear, while the 3-4 clutch 39 is released, the 2-4 brake 33 is put on and therefore regulation of braking timing is required but at the time of shift down other than the above, only the 3-4 clutch 39 or the 2-4 brake 33 is released and braking timing by line pressure is not required.

Regarding the process at shift down from the third gear to the second gear, at step $S_{A5}$ the turbine r.p.m. is read and at step $S_{A6}$ the base line pressure $Pl_0$ is decided according to the turbine r.p.m., namely, at shift down from the third gear to the second gear, the 3-4 clutch 39 is released to the neutral state and when the turbine r.p.m. becomes a proper r.p.m., the 2-4 brake 33 is put on, but since the braking time varies with the turbine r.p.m., the base line pressure $Pl_0$ according to the turbine r.p.m. is stored as map in a memory in the control unit and the base line pressure $Pl_0$ is obtained from the map.

Then, at steps $S_{A7}$, $S_{A8}$ line pressure is corrected according to the throttle opening changing speed calculated from throttle opening values of plural times of detection, namely, since the faster the throttle opening changing speed, the faster the rising speed of engine r.p.m. (turbine r.p.m.), in order to accelerate the braking timing in conformity with it the coefficient of correction Ca is decided according to the throttle opening changing speed. By multiplying the base line pressure $Pl_0$ by this coefficient of correction Ca, the final line pressure P1 is obtained.

Following the step $S_{A3}$ or the step $S_{A8}$, at step $S_{A9}$ the duty ratio of the duty electromagnetic valve SOL is decided, at step $S_{A10}$ the solenoid driving frequency is set, at step $S_{A11}$ the solenoid ON time is calculated and at step $S_{A12}$ the duty electromagnetic valve SOL is driven.

An explanation is made about the line pressure correction by learning of the speed shifting time in FIG. 7.

This routine is to correct the line pressure Pl obtained at step $S_{A3}$ in FIG. 5 at shift down. At shift down, since the turbine r.p.m. reduces down to the r.p.m. at after the speed change as friction elements are gradually connected and the speed shifting time relates to the connecting speed of friction elements, correction of line pressure is done according to the speed shifting time. In this routine, at step $S_{B1}$ the turbine r.p.m. is read and at step $S_{B2}$ a target turbine r.p.m. after speed shifting is calculated from the turbine r.p.m. before speed shifting. Then, at step $S_{B3}$ whether or not speed shifting terminated is judged by whether or not such requirements that the difference between the turbine r.p.m. and the target turbine r.p.m. is less than the specified value and the rate of change of the turbine r.p.m. is less than the specified value are met. If it is judged that speed shifting terminated, at step $S_{B4}$ the speed shifting time T until the turbine r.p.m. becomes the above-mentioned target turbine r.p.m. after speed shifting is calculated.

Figure 8:
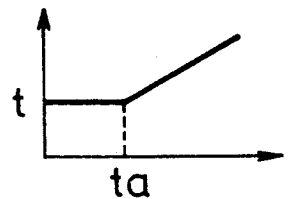
FIG. 8 shows shortened time characteristic of the target value of speed shifting time to oil temperature of line pressure.

Then, at steps $S_{B5}$-$S_{B10}$ the target value $T_0$ of the speed shifting time is changed according to the oil temperature of line pressure. More particularly, at step $S_{B5}$ the turbine r.p.m. Tsp is compared with the set value Na, at step $S_{B6}$ the throttle opening Th is compared with the set value $\theta a$ and at step $S_{B7}$ the oil temperature $T_F$ of line pressure is compared with the set value ta. Then, if the oil temperature $T_F <$ ta under the condition of Tsp $\geq$ Na and Th $\geq \theta a$, at step $S_{B8}$ the target value $T_0$ of the speed shifting time is maintained mt its value $T_0$. On the other hand, if the oil temperature $T_F \geq$ ta, at step $S_{B9}$ the target value $T_0$ is shortened to $T_0 = T_0 - t$ so as to reduce the quantity of heat generation due to sliding of friction elements and at step $S_{B10}$ a speed shifting time change signal is dispatched to the engine control unit 100. The time t to shorten the target value $T_0$ of the speed shifting time is, as shown in FIG. 8, the small specified value in the range of $T_F <$ ta but has such characteristic that in the range of $T_F \geq$ ta it grows larger sa the oil temperature $T_F$ goes up.

Figure 9:
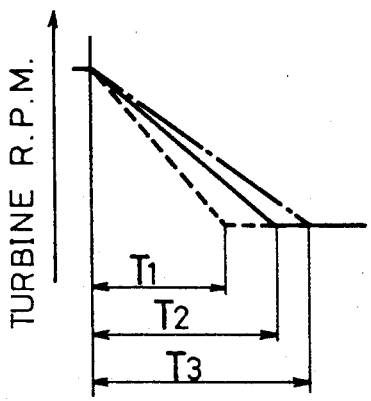
FIG. 9 is an explanatory drawing of how the turbine r.p.m. changes at speed shifting.
Figure 10:
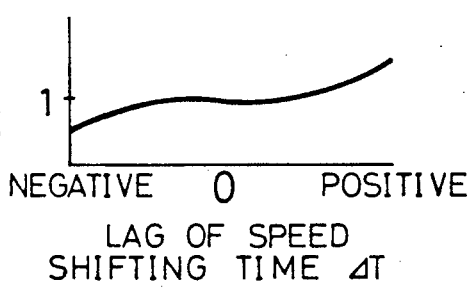
FIG. 10 shows coefficient of correction characteristic to lag of speed shifting time.

Then, at step $S_{B11}$ the difference $\Delta T$ between the actual speed shifting time and the target value $T_0$ is calculated and at step $S_{B12}$ the coefficient of correction Ct in FIG. 10 is calculated according to the above difference $\Delta T$. More particularly, in the case where the difference $\Delta T$ is close to zero Ct is set at 1 (Ct=1) but as shown in FIG. 9, in the case where the speed shifting time $T_1$ is short and the difference $\Delta T$ is negative the speed shifting time is prolonged by setting Ct smaller than 1 (Ct<1) and reducing line pressure, but in the case where the speed shifting time $T_2$ is long and the difference $\Delta T$ is positive, the speed shifting time is shortened by setting Ct larger than 1 (Ct>1) and increasing line pressure.

Then, at step $S_{B13}$ the line pressure P mentioned above is corrected by the coefficient of correction Ct (P=P × Ct) and the corrected line pressure P is utilized for the next control.

Figure 11:
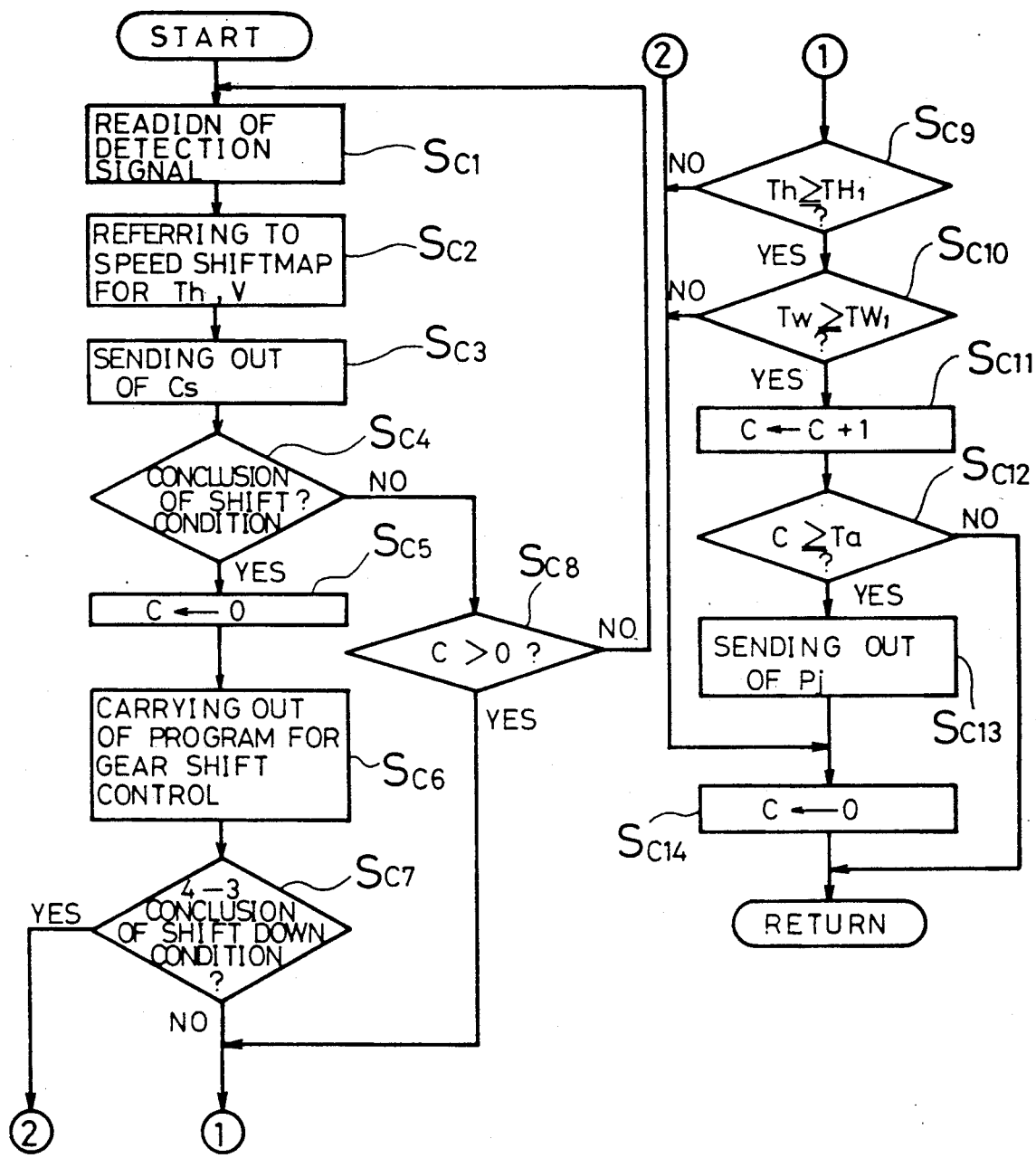
FIG. 11 and FIGS. 12A and 12B are flow charts, each showing the lag angle control of igniting time at speed shifting.
Figure 12A:
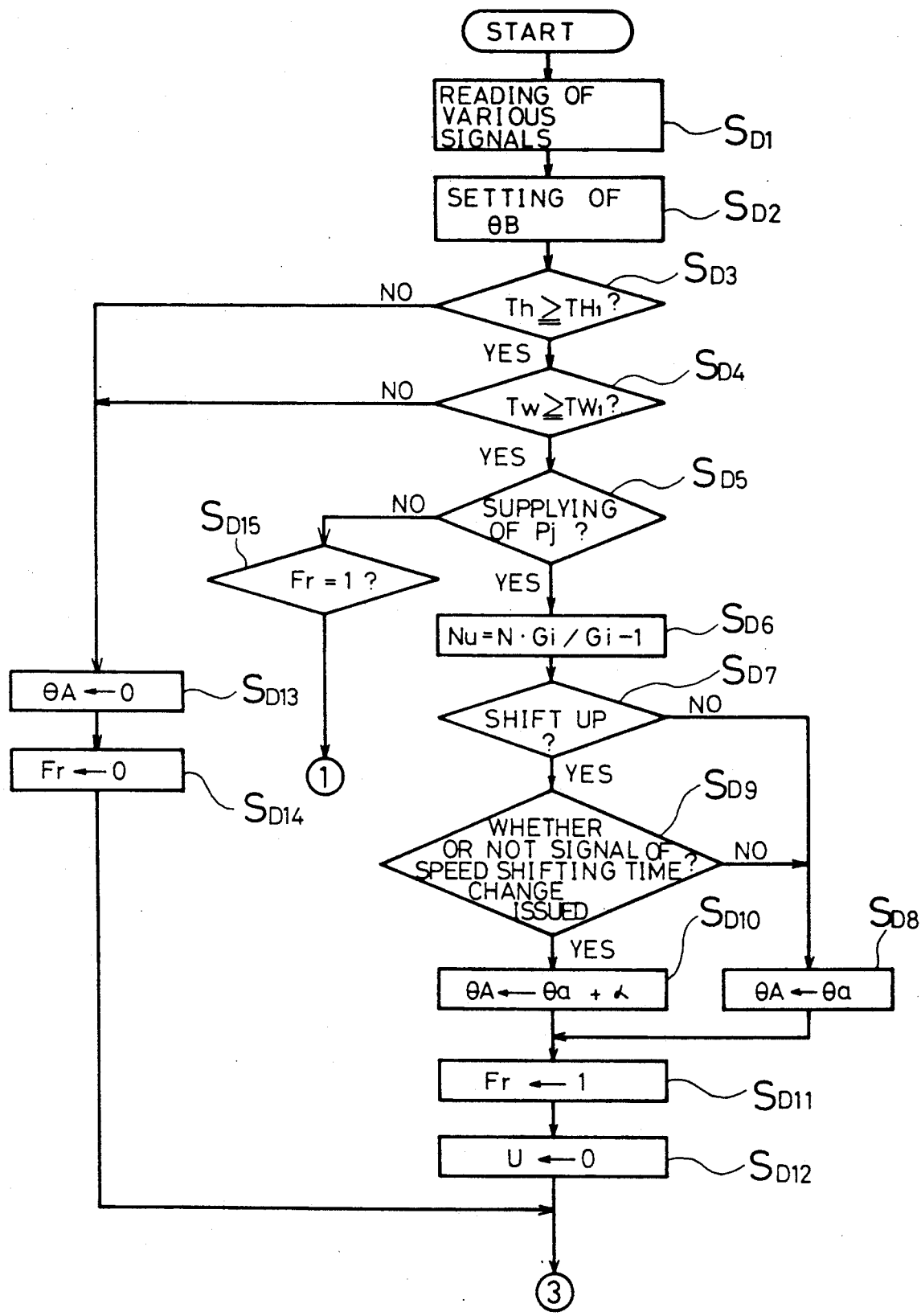
Figure 12B:
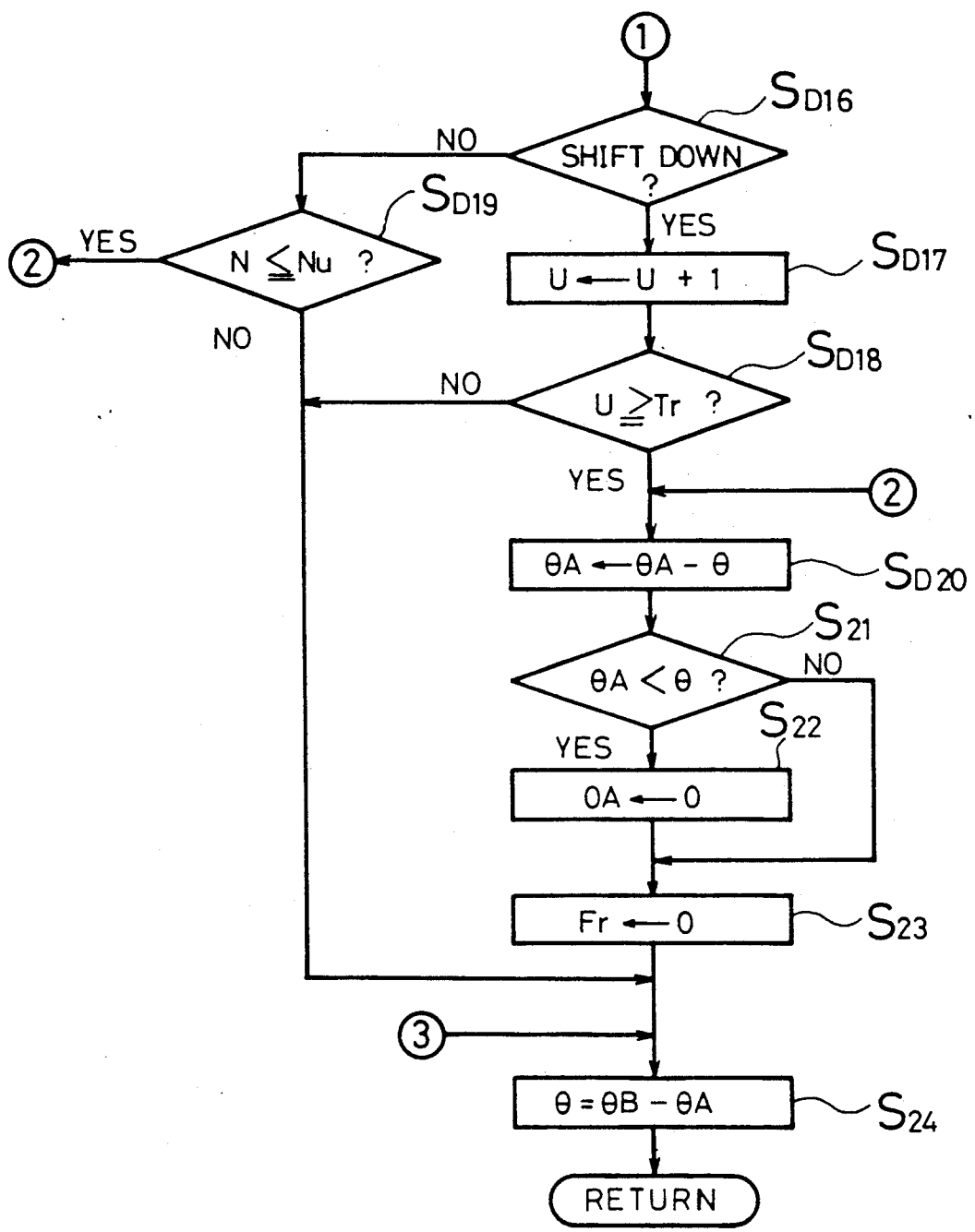

Control flow charts in FIG. 11 and FIG. 12 show the control for reducing torque of the engine 1 at speed shifting to relieve the speed shift shock in the case where speed shifting is carried out at the automatic transmission 10. The reduction of torque is carried out by the lag angle control of igniting time.

FIG. 11 relates to dispatching of the lag angle instruction signal from the transmission control unit 200 to the engine control unit !00 at speed shift and FIG. 12 relates to the lag angle control on the igniting time of mixture by the engine control unit 100 upon receipt of the lag angle instruction.

In FIG. 11, at step $S_{C1}$ detection signals from various sensors are read, at step $S_{C2}$ the signals are collated with the speed shift map in which the throttle opening Th and the vehicle velocity V are stored beforehand and at step $S_{C3}$ the speed shift information signal Cs indicating the gear position at the time is sent out.

Then, at step $S_{C4}$ whether or not the requirements for speed shift are met is judged and if the requirements are met, at and after step $S_{C5}$ the lag angel instruction signal is outputted after the lapse of the specified time. More particularly, if the requirements for speed shift are met, at step $S_{C5}$ the lapse of time counter C is set initially at C=0, at step $S_{C6}$ speed shifting is done by practicing the program for speed shift control and at step $S_{C7}$, whether or not the requirements for 4→3 shift down are met is judged. In the case other than the case where the requirements are met and in the case where after the requirements are met, lapse of time thereafter is being measured (in the case of counter C>0 at step $S_{C8}$), so far as the throttle opening Th is more than the specified value TH$_1$ at step $S_{C9}$ and the temperature of engine cooling water Tw is more than the specified value TW$_1$ at step $S_{C10}$, at step $S_{C11}$ the lapse of time counter C is renewed and if the lapse of time C exceeds the specified time Ta at step $S_{C12}$, at step $S_{C13}$ the lag angle pulse signal Pj (as lag angle instruction signal) is dispatched and at step $S_{C14}$ the lapse of time counter C is restored to C=0 and RETURN.

An explanation is made below about the lag angle control of igniting time at speed shifting in FIG. 12.

Upon starting, at step $S_{D1}$ various signals from sensors are read and at step $S_{D2}$ the basic ignition advance angle value $\theta_B$ is set on the basis of the intake negative pressure and the r.p.m. of engine. Then, at step $S_{D3}$ whether nor not the throttle opening Th exceeds the value TH$_1$ is judged and at step $S_{D4}$ whether or not the temperature of engine cooling water Tw is higher than the value TW$_1$ is judged. If it is judged that Th $\geq$ TH$_1$ and Tw $\geq$ TW$_1$, at step $S_{D5}$ whether or not the lag angle pulse signal Pj was supplied is judged. If it is judged that the lag angle pulse signal Pj was supplied, at step $S_{D6}$ the estimated r.p.m. of engine Nu is calculated by the formula Nu = N Gi/Gi−1, using the r.p.m. of engine N and the gear ratio before and after speed shifting action Gi−1 and Gi.

Figure 14:
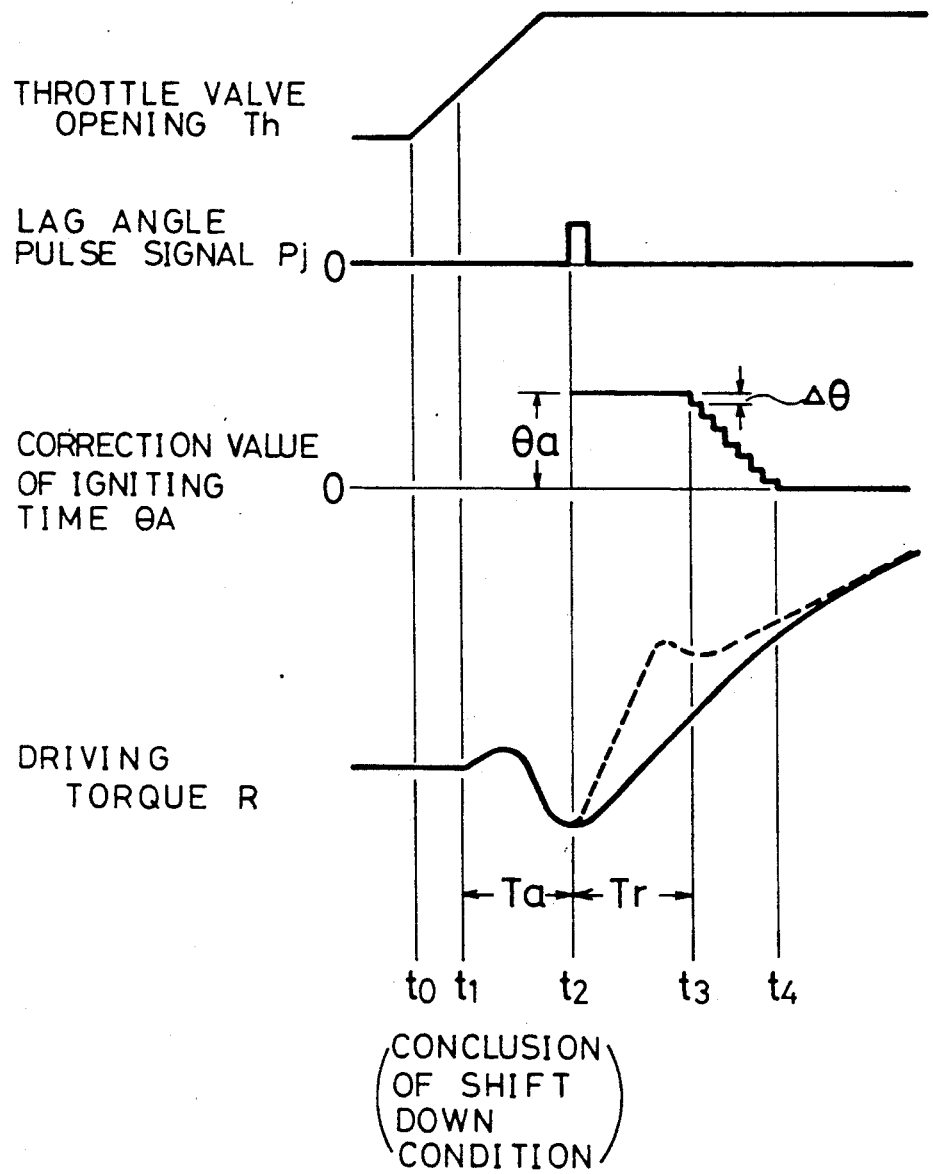
FIG. 14 is an explanatory drawing of how shift down is done.

Then, at steps $S_{D7}$-$S_{D10}$ the correction value $\theta_A$ of the basic ignition advance angle $\theta_B$ is calculated. Concretely, at step $S_{D7}$ whether or not it is the shift up time of the automatic transmission 10 is judged. At shift down, since the target value $T_0$ of the speed shifting time is not changed, at step $S_{D8}$ $\theta_A = \theta a$ is set as shown in FIG. 14. On the other hand, at shift up, at step $S_{D9}$ whether or not the speed shifting time change signal is received is judged and if it is not received, at step $S_{D8}$ $\theta_A = \theta a$ is set as shown in FIG. 15. If the shifting time change signal is received, at step $S_{D10}$ the correction value $\theta_A$ is set at $\theta_A = \theta a + \alpha$. As shown in FIG. 3, the shorter the target value $T_0$ of the speed shifting time, the smaller the value of $\alpha$. More particularly, the shorter the target value $T_0$ of the speed shifting time, the larger the correction value $\theta_A$ is made so as to enlarge the lag angle quantity of ignition time and restrict torque of the engine 1 to a smaller value, thereby reducing torque shock to a large extent. Then, at step $S_{D11}$ the lag angle flag Fr is set to Fr=1, at step $S_{D12}$ the count number U is set to U=0 and at step $S_{D24}$ the ignition advance angle $\theta$ is set, on the basis of the basic value $\theta_B$ and the correction value $\theta_A$, to the formula $\theta = \theta_B - \theta_A$ and RETURN.

In the case where Th <TH$_1$ or Tw <TW$_1$ at step S$_{D3}$ or S$_{D4}$, at step S$_{D13}$ the speed shift correction value $\theta_A$ is set to zero and at step S$_{D14}$ the lag angle flag Fr is set to zero and RETURN.

After the lag angle pulse signal Pj was received at step S$_{D5}$, since the lag angle flag Fr=1 at step S$_{D15}$ at and after step S$_{D16}$ the lag angle control on ignition time is carried out actually. More particularly, at step S$_{D16}$ whether or not the speed shifting action of the automatic transmission 10 is shift down action is judged. If it is judged to be the shift down action, at step S$_{D17}$ the lapse of time counter U is renewed and if the lapse of time comes to the specified value Tr at step S$_{D18}$, at step S$_{D20}$ a new speed shift correction value $\theta_A$ (speed shift correction value $\theta_A$ minus the value $\Delta\theta$) is set. On the other hand, if the speed shift action is the shift up action at step S$_{D16}$, at step S$_{D19}$ whether or not the r.p.m. of engine N is engine N becomes below the estimated r.p.m. Nu, the speed shift correction value $\theta_A$ is reduced by the value $\Delta\theta$ as shown in FIG. 15, similarly to the case of shift down. Then, at step S$_{D21}$ whether nor not the speed shift correction value $\theta_A$ is less than zero. If the speed shift correction value $\theta_A$ becomes less than zero ($\theta_A < 0$), at step S$_{D23}$ the lag angle flag Fr is set to Fr =0 and at step S$_{D24}$ the ignition advance angle value $\theta$ is set and RETURN.

Thus, a speed shifting time detecting means 80 which detects the speed shifting time T (from starting of speed shift by operation of friction elements worked by line pressure until the speed shift terminates) by steps S$_{B3}$-S$_{B4}$ of control flow in FIG. 7 is composed. Also, a line pressure correcting means 81 which, by steps S$_{B1}$-S$_{B13}$ of the control flow, calculates the coefficient of correction Ct so that the speed shifting time T to be detected by the speed shifting time detecting means 80 may become the target value T$_0$ and corrects the line pressure P by said coefficient of correction by controlling the line pressure regulating means 77 (especially the duty electromagnetic valve SOL) is composed. In addition, a target value changing means 82 which, by steps S$_{B5}$-S$_{B10}$ of the control flow, calculates the time t on the basis of the characteristic drawing (FIG. 8) and according to the oil temperature Tp of line pressure to be detected by the oil temperature sensor 48 and changes the target value T$_0$ of the speed shifting time by this time t is composed.

Further composed are a high load time detecting means 83 which, by steps S$_{B5}$ and S$_{B6}$ of the control flow in FIG. 7, detects high load time under the cOndition that the turbine r.p.m. Tsp is more than the set value Na (Tsp $\geq$ Na) and the throttle opening Th is more than the set value $\theta$a (Th $\geq \theta$a), a line pressure setting means 84 which, by steps S$_{A2}$ and S$_{A3}$ of the control flow in FIG. 5, sets the line pressure Pl according to the gear position and the throttle valve opening and an output reducing means 85 which, by step S$_{D12}$ of FIG. 12, sets the a value in such a fashion that the shorter the target value T$_0$ of speed shifting time, the larger the $\alpha$ value is set and reduces engine output to a large extent by enlarging the correction value $\theta_A$ and enlarging the quantity of lag angle of igniting time.

In the above embodiment, since line pressure P is corrected by the coefficient of correction Ct at each shift up in the automatic transmission 10, the speed shifting time is gradually converged to the target value T$_0$.

In the above case, under the condition that the oil temperature T$_F$ of line pressure is high (T$_F \geq$ ta) the temperature of each friction elements rises due to its sliding at speed shifting and each friction elements is easy to overheat especially at the time of high load (turbine r.p.m. Tsp $\geq$ Na and throttle opening Th $\geq \theta$a). Therefore, under the above condition, the target valve T$_0$ of speed shifting time is shortened by the time t obtained from FIG. 8 according to the oil temperature T$_F$ of line pressure. Accordingly, the sliding time of friction elements is shortened, quantity of heat generation due to sliding of friction elements reduces and overheating of friction elements is restricted. Thus, durability of friction elements is improved and their reliability is promoted.

Figure 13:
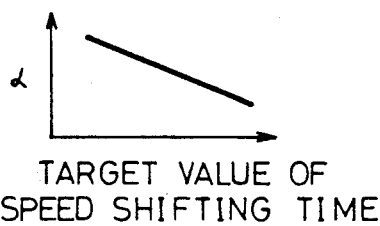
FIG. 13 shows correction amount characteristic at igniting time to the target value of speed shifting time.

Moreover, in the case where the target value T$_0$ of speed shifting time is made shorter, speed shift shock will increase the more but in reality, the quantity of lag angle at igniting time at speed shifting increases by the specified value $\alpha$ obtained from FIG. 13 and the extent of reduction of torque at speed shifting becomes large. Therefore, speed shift shock does not increase and good speed shift can be ensured.

In the above embodiment, if the oil temperature of line pressure at high load is high, the target value T$_0$ of speed shifting time is shortened but the present invention is not limited to this and it is possible to change the target value T$_0$o speed shifting time according to the oil temperature of line pressure, irrespective of magnitude of engine load.

What is claimed is.

1. A speed shifting time control device of an automatic transmission, comprising:

a line pressure regulating means which can regulate line pressure optionally:

a speed shifting time detecting means to detect time of speed shifting which is done by operation of friction elements worked by line pressure;

a line pressure correcting means to correct line pressure by controlling the line pressure regulating means so as to COnfOrm the speed shifting time detected by the speed shifting time detecting means to a target value;

an oil temperature detecting means to detect the temperature of oil of line pressure; and a target value changing means to change the target value of speed shifting time according to the oil temperature detected by the oil temperature detecting means.

2. A speed shifting time control device of an automatic transmission according to claim wherein the target value changing means changes the target value of speed shifting time in such a fashion that the higher the oil temperature of line pressure detected by the oil temperature detecting means, the shorter the target value is made.

3. A speed shifting time control device of an automatic transmission according to claim or claim 2, wherein the target value changing means changes the target value of speed shifting time according to the oil temperature detected by the oil temperature detecting means only at gear change for shift up.

4. A speed shifting time control device of an automatic transmission according to claim 1 or claim 2, wherein the speed shifting time detecting means calculates a target turbine r.p.m. after speed shifting on the basis of the turbine r.p.m. immediately before speed shifting and detects the time, during which the actual turbine r.p.m. comes to the target turbine r.p.m. after speed shifting, as speed shifting time.

5. A speed shifting time control device of an automatic transmission according to claim 1 or claim 2, wherein the target value changing means changes the target value of speed shifting time to a shorter time only when the oil temperature detected by the oil temperature detecting means is high at the time of high load detected by a high load time detecting means which detects high load time.

6. A speed shifting time control device of an automatic transmission according to claim 5, wherein the high load time detecting means detects as high load time when the turbine r.p.m. is more than the set value and the throttle opening is more than the set value and the target value changing means changes the target value of speed shifting time to a shorter time according to the oil temperature of line pressure when the high load time detecting means detects as high load time and the oil temperature of line pressure detected by the oil temperature detecting means is higher than the set value.

7. A speed shifting time control device of an automatic transmission according to claim 1, further comprising line pressure setting means to set line pressure according to the gear position and the thrOttle opening, wherein the line pressure correcting means corrects line pressure set by the line pressure setting means.

8. A speed shifting time control device of an automatic transmission according to claim 7, wherein the lien pressure correcting means corrects line pressure set by the line pressure setting means by learning-control.

9. A speed shifting time control device of an automatic transmission according to claim 7, wherein at gear change for shift up the line pressure correcting means corrects line pressure set by the line pressure setting means.

10. A speed shifting time control device of an automatic transmission according to claim 1 or claim 2, further comprising an output reducing means to reduce output of the engine during speed shifting done by operation of friction elements worked by line pressure.

11. A speed shifting time control device of an automatic transmission according to claim 10, wherein the output reducing means delays the igniting time of mixture which is supplied to the engine.

12. A speed shifting time control device of an automatic transmission according to claim wherein the output reducing means delays the igniting time of mixture the more, the more the target value of speed shifting time is shortened.

* * * * *